US007617202B2

(12) United States Patent
Brill et al.

(10) Patent No.: US 7,617,202 B2
(45) Date of Patent: Nov. 10, 2009

(54) SYSTEMS AND METHODS THAT EMPLOY A DISTRIBUTIONAL ANALYSIS ON A QUERY LOG TO IMPROVE SEARCH RESULTS

(75) Inventors: Eric D. Brill, Redmond, WA (US); Philip F. Carmichael, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 10/462,473

(22) Filed: Jun. 16, 2003

(65) Prior Publication Data

US 2004/0254920 A1    Dec. 16, 2004

(51) Int. Cl.
 *G06F 17/30* (2006.01)
(52) U.S. Cl. .......................................................... 707/5
(58) Field of Classification Search .................. None
 See application file for complete search history.

(56) References Cited

U.S. PATENT DOCUMENTS

| | | | | | |
|---|---|---|---|---|---|
| 5,325,091 | A | * | 6/1994 | Kaplan et al. .................. | 341/51 |
| 5,440,482 | A | * | 8/1995 | Davis ............................. | 707/6 |
| 5,628,011 | A | * | 5/1997 | Ahamed et al. ................ | 707/10 |
| 5,963,942 | A | * | 10/1999 | Igata .............................. | 707/6 |
| 6,006,225 | A | * | 12/1999 | Bowman et al. ............... | 707/5 |
| 6,144,958 | A | * | 11/2000 | Ortega et al. .................. | 707/5 |
| 6,169,986 | B1 | * | 1/2001 | Bowman et al. ............... | 707/5 |
| 6,185,558 | B1 | * | 2/2001 | Bowman et al. ............... | 707/5 |
| 6,199,062 | B1 | * | 3/2001 | Byrne et al. .................... | 707/3 |
| 6,487,641 | B1 | * | 11/2002 | Cusson et al. ................. | 711/144 |
| 6,687,696 | B2 | * | 2/2004 | Hofmann et al. .............. | 707/6 |
| 6,785,671 | B1 | * | 8/2004 | Bailey et al. ................... | 707/3 |
| 6,947,933 | B2 | * | 9/2005 | Smolsky ........................ | 707/6 |
| 2004/0254920 | A1 | * | 12/2004 | Brill et al. ..................... | 707/3 |

OTHER PUBLICATIONS

"Correlation function—Wikipedia". Available online at http://en.wikipedia.org/wiki/Correlation_function. Accessed May 30, 2006.*
Smith, P. D. 1991. Experiments with a very fast substring search algorithm. Softw. Pract. Exper. 21, 10 (Sep. 1991), 1065-1074. DOI= http://dx.doi.org/10.1002/spe.4380211006.*
Sunday, D. M. 1990. A very fast substring search algorithm. Commun. ACM 33, 8 (Aug. 1990), 132-142. DOI= http://doi.acm.org/10.1145/79173.79184.*

(Continued)

*Primary Examiner*—Neveen Abel Jalil
*Assistant Examiner*—Mark Andrew X Radtke
(74) *Attorney, Agent, or Firm*—Lee & Hayes, PLLC (57) ABSTRACT

The present invention provides systems and methods that employ a statistical distributional analysis to improve content search engine search results. In particular, a substring and/or a string sequence distributional algorithm can be applied to a set of queries to generate a distributional characteristic (e.g., a profile) for the set of queries, wherein the set is selected from a plurality of queries stored on a query log. Typically, the queries are selected based on a substring of interest and/or an identification of a user initiating searches. The distributional characteristic can then be employed to determine a distributional similarity measure that can be utilized in connection with a search to facilitate search results via providing a mechanism to determine synonymous search terms, spelling corrections/variations, and facilitate collaborative filtering, for example. Thus, the present invention employs a novel technique that mines and employs previous queries to enhance the query search results.

34 Claims, 8 Drawing Sheets

OTHER PUBLICATIONS

Boyer, R. S. and Moore, J. S. 1977. A fast string searching algorithm. Commun. ACM 20, 10 (Oct. 1977), 762-772. DOI= http://doi.acm.org/10.1145/359842.359859.*

Knuth, D.E. Morris, J.H. and Pratt, V.R. 1977. Fast Pattern Matching in Strings. SICOMP 6, 2 (1977), 323-350. DOI=10.1137/0206024.*

Ferragina, P. and Grossi, R. 1998. Optimal On-Line Search and Sublinear Time Update in String Matching. SIAM J. Comput. 27, 3 (Jun. 1998), 713-736. DOI= http://dx.doi.org/10.1137/S0097539795286119. Abstract.*

Real Term, Dynamic Content Management Solution (white paper), http://www.infogistics.com/, (C) 2001, Infogistics Limited, 13 pages.

Ralph Neininger, "Distributional Analysis of Recursive Algorithms by the Contraction Method", University of Freiburg, Nov. 22, 1999, 4 pages.

Jussi Karlgren and Magnus Sahlgren, "Vector-based Semantic Analysis using Random Indexing and Morphological Analysis for Cross-Lingual Information Retrieval", 2001, 5 pages.

Marti A. Hearst, "TileBars: Visualization of Term Distribution Information in Full Text Information Access", May 1995, 8 pages.

* cited by examiner

SYSTEMS AND METHODS THAT EMPLOY A DISTRIBUTIONAL ANALYSIS ON A QUERY LOG TO IMPROVE SEARCH RESULTS

TECHNICAL FIELD

The present invention generally relates to search engine query results, and more particularly to systems and methods that improve content search engine results via a distributional analysis of a search query log.

BACKGROUND OF THE INVENTION

The evolution of computers and networking technologies from high-cost, low performance data processing system to low cost, high-performance communication, problem solving and entertainment systems has provided a cost-effective and time saving means to lessen the burden of performing every day tasks such as correspondence, bill paying, shopping, budgeting and information gathering. For example, a computer (e.g., a desktop, a laptop, a hand-held and a cell phone) interfaced to the Internet, via wire or wireless technology, can provide the user with a channel for nearly instantaneous data exchange (e.g., via email, newsgroups and ftp) and merchandise consumption, and access to a wealth of information from a repository of web sites and servers located around the world, at the user's fingertips.

Typically, the information available via the web sites and servers is accessed via a web browser executing on a web client (e.g., a computer). For example, a web user can deploy a web browser and access a web site by entering the web site Uniform Resource Locator (URL) (e.g., a web address and an Internet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., com, org, net, gov and edu) that identifies the type of organization. As an example, for the fictitious address http://www.foo.com, http specifies the web server uses Hypertext Transfer Protocol (HTTP), www specifies the web site is on the World Wide Web, foo specifies the web server is located at Foo Corporation, and corn specifies that Foo Corporation is a commercial institution.

Likewise, a user can deploy a web browser to access a server. For example, the URL for an FTP (File Transfer Protocol) server is similar to the URL associated with a typical web site. In general, the FTP server URL includes a protocol, a location, a name of the server maintainer, and an appropriate suffix. For example, the fictitious address ftp://ftp.foo.com can be employed, and signifies an FTP server for the Foo commercial institution, wherein communication is achieved via the FTP. In general, FTP is typically employed to make files and folders publicly available for transfer over the Internet. Typically, a password is employed to log on and gain access to the files and folders on the server, or computer. However, FTP often can be utilized to gain access to certain networks or servers without having an account or being an official password holder with that server or computer. For example, an "anonymous" FTP server can be setup, and can contain a broad range of data that can be publicly available through FTP, wherein a generic password such as "guest" or "anonymous, "or a null password can be employed.

In many instances, the user knows, a priori, the name of the site or server, and/or the URL to the site or sever that the user desires to access. In such situations, the user can access the site, as described above, via entering the URL in the address bar and connecting to the site. However, in other instances, the user does not know the URL or the site name. Instead, the user employs a search engine to facilitate locating a site(s) based on a keyword(s) provided by the user. In general, the search engine is an executable application(s) or program(s) that searches the content of web sites and severs for a keyword(s), and returns a list of links to web sites and severs where the keyword(s) were found. Basically, the search engine transmits a spider to retrieve as many documents as possible associated with the keyword(s). Then, an indexer reads the documents, and creates a prioritized index based on the words contained in each document. Respective search engines generally employ a proprietary algorithm to create indices such that meaningful results are returned for a query.

The large volume of information available via the Internet and the trend to associate a plethora of terms with a site and/or server (e.g., in order to increase the probability of being selected for inclusion in the list of links) commonly results in hundreds or thousands of links returned to the user, wherein many of the links provide access to sites and servers that are not useful to the user. Even a much smaller list of twenty links, for example, can lead a user down a time consuming path comprising non-significant links. In addition, many times several searches are performed utilizing various keywords in anticipation of retrieving a link(s) with a greater correlation to the information the user desires.

One technique employed by search engines to increase search success and reduce superfluous results is a means to search for a word, several words, and a phrase, and to employ Boolean operators. However, and as noted above, a site can be associated with many words and phrases to provide a broad and generic facade in order to increase the chance of being selected in an attempt to increase market exposure. Another technique utilized employs a string-based distributional analysis. Linguists have utilized string-based distributional analysis since the early 1900's to learn information about a lost language solely from a collection of text in that language. By way of example, assume the lost language is English. With absolutely no knowledge of the language, one could discover that the strings "dog" and "cat" are related because they are distributionally similar in text. In other words, it can be observed that the words that precede and follow, or appear in the vicinity of the string "dog" are very similar to the words that appear in the vicinity of the string "cat." String-based distributional analysis provides a useful mechanism in the running text domain to facilitate determining similar text and improve searches; however, string-based distributional analysis is limited in that it merely employs words that precede and follow the term(s) of interest.

SUMMARY OF THE INVENTION'

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods that employ a substring and/or a string sequence distributional (e.g., statistical) analysis on a set of search queries obtained from a query log, in connection with a search engine search query, to improve content search engine results. In general, when a user employs a search engine via a web browser to search for information on the Internet, the search string, or query entered into the search engine by the user is typically saved to a log. In addition, information such as a user identification can be saved to the log and associated with the query. Thus, the query log can include executed queries and other valuable information, which can be utilized as a source to learn (e.g., automatically) about a query(s) and a user(s). Such learning can enhance the user's search experience via providing a mechanism to facilitate returning information more pertinent to a respective search query.

The systems and methods of the present invention leverage the information stored in the query log via selectively obtaining, or mining queries from the log, based on criteria such queries associated with a substring, a string, a string sequence, a keyword, and/or a user, to construct a set of queries that can provide information for a present search. Then, the set of queries can be processed to provide a statistical pattern (e.g., a substring and/or a string sequence distributional profile (e.g., a probability distribution)), which can be subsequently analyzed and processed. For example, a distributional similarity measure can be generated, and then employed in connection with the search engine search.

The foregoing can improve search engine query results by providing for synonymous search terms, spelling corrections/variations, and facilitating collaborative filtering, which can enhance subsequent searches in order to return results with a greater degree of correlation to the content being searched by the user. In addition, the statistical pattern can be employed to facilitate determining what queries are failing and why the queries are failing. Furthermore, the statistical pattern can be employed to provide information regarding correlated searches, which can facilitate anticipating a user's needs.

Conventional distributional techniques have employed string-based distributional analysis to determine text similarity. Such techniques merely rely on preceding or following text. For example, the similarity between two strings can be determined by observing that the words that precede and follow, or appear in the vicinity of the two strings are very similar. However, such analysis merely analyzes words that precede and follow the strings, and does not exploit the rich information, the search queries and the user information, included in the query log.

In one aspect of the present invention, a system is provided that obtains a set of queries from a query log and generates a distributional profile for the set of queries in accordance with an aspect of the present invention. The query log is typically a storage medium, wherein a plurality of search queries and associated information (e.g., a unique user ID) is saved when a search engine is deployed. The queries retrieved from the query log are typically selected based on criteria, for example a substring, a string and/or a unique identifier. After the set of queries is obtained, statistical information such as the frequency of occurrence for respective queries can be computed, and then employed when generating the distributional profile. Various distributional algorithms such as a substring distributional instruction set and a string sequence distributional instruction set can be employed.

In another aspect of the present invention a system that generates a distributional characteristic for a set of queries and determines a distributional similarity-based on the distributional characteristic is provided in accordance with an aspect of the present invention. The system typically populates the set of queries via obtaining queries from a query log based on a substring, a string and/or a unique identifier. Then, depending on the distributional algorithm being employed (e.g., substring and string sequence), statistical information can be computed and utilized to facilitate generating the distributional characteristic for the set of queries. After generating the distributional characteristic, a distributional similarity (e.g., employing any known technique such as a cosine distance, the Jaccard coefficient, an entropy-based measure, a divergence measure and/or a relative separation measure) can be computed.

In other aspect of the invention, a system including a search engine and an information repository are employed in connection with the novel aspect of the present invention. In addition, methodologies are provided to generate distributional characteristics, and subsequently employ the generated distributional characteristics to determine a distributional similarity.

As noted supra, the foregoing systems and methods can be employed to enhance search engine results via providing a mechanism to determine synonymous search terms, spelling corrections/variations, and to facilitate collaborative filtering. In addition, information indicative of what queries are failing and why queries are failing can be obtained. Moreover, results associated with subsequent searches can achieve a greater degree of correlation to the content being searched.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention relates to systems and methods that employ a distributional analysis (e.g., substring and string sequence) on a set of queries to improve content search engine results. The systems and methods provide for obtaining queries from a query log to construct the set of queries based on a string and/or user. After obtaining the set of queries, a distributional characteristic, or profile is generated for the set of queries. The distributional characteristic can then be employed to determine distributional similarity between queries. The similarity measure can be utilized to improve search engine queries by providing a mechanism to determine synonymous search terms, spelling corrections, spelling variations, and to facilitate collaborative filtering. In addition, the systems and methods of the present invention can facilitate determining what queries are failing and why the queries are failing, and provide information regarding correlated searches, which can facilitate anticipating a user's needs. The foregoing can enhance a subsequent user search by facilitating returning results that are more correlated to the string employed in the search query.

It is to be appreciated that as utilized herein, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and/or a computer. As an example, both an application running on a server and the server can be a computer component. One or more components can reside within a process and/or thread of execution and a component can be localized on one computer and/or distributed between two or more computers.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred action in connection with the subject invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

Figure 1:
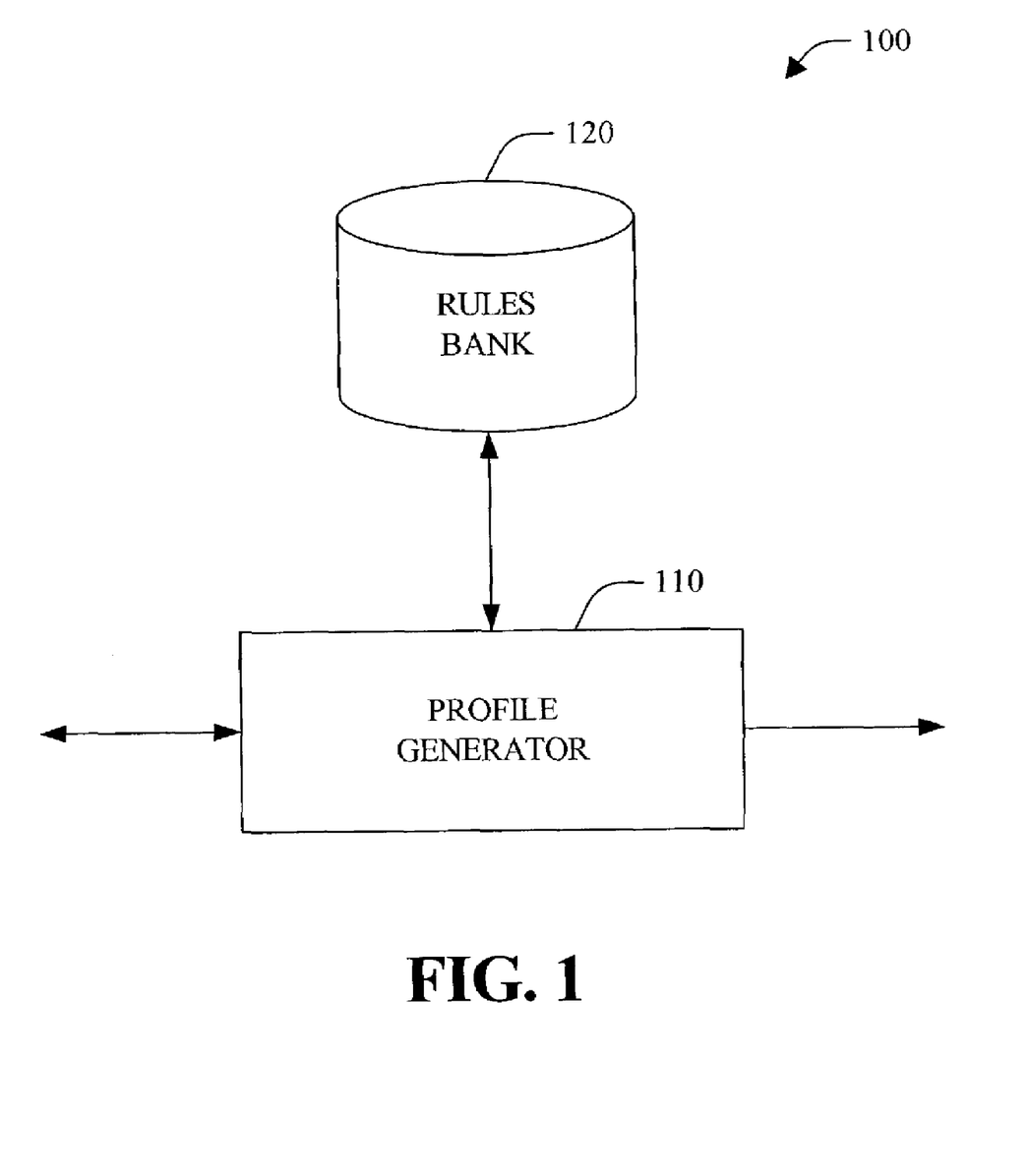
FIG. 1 illustrates a distributional analysis system that facilitates search engine search query results, in accordance with an aspect of the present invention.

FIG. 1 illustrates a system 100 that analyzes a query log to facilitate search engine returned results in accordance with an aspect of the present invention. The system 100 includes a profile generator 110 that can generate a distributional characteristic for a set of queries and a rules bank 120 that can store one or more distributional algorithms employed by the profile generator 110. In general, the profile generator 110 can access the rules bank 120 and retrieve the distributional algorithm (e.g., an instruction set). Then, the profile generator 110 can obtain the set of queries from the query log, based in part on the distributional algorithm selected. After obtaining the set of queries, the profile generator 110 can apply the distributional algorithm to the set of queries to generate a distributional profile, or characteristic for the set of queries. The distributional profile can then be further processed and/or utilized to facilitate improving search engine search query results.

As briefly noted above, the profile generator 110 can generate a distributional characteristic for the set of search queries. Generally, the set of search queries can be retrieved from a storage medium, wherein search queries (e.g., a keyword(s) or term(s)) are written when a user deploys a search engine to execute the search query. In addition to the search query, other information such as a unique user identification can be saved to the storage medium and associated with a corresponding search query.

The set of queries obtained by the profile generator 110 can comprise one or more of the saved search queries or a null set, and is typically dependent on the distributional algorithm selected for employment. For example, the distributional algorithm selected can provide an instruction set to generate a distributional profile associated with an individual user. The profile generator 110 can then employ the unique user identifier as query discrimination criterion (e.g., a search query filter) to select queries from the storage medium that are consonant with queries initiated by the individual user. In another aspect of the present invention, the profile generator 110 can obtain the distributional algorithm prior to selecting queries. Then, the profile generator 110 can employ the distributional algorithm to facilitate selecting queries. For example, the algorithm can provide a query selection instruction(s) to be executed by the profile generator 110. In another example, the type of distributional algorithm can map to selection criteria. In yet another example, execution of the algorithm can include receiving suitable queries.

The profile generator 110 can employ various techniques to obtain the set of queries. For example, in one aspect of the present invention, the profile generator 110 can access the storage medium and retrieve at least a portion of the saved data therein. For example, the profile generator 110 can query the saved search information via employing a search string and/or information associated with a search query (e.g., a globally unique identifier (GUID)) as search criteria, wherein the set of queries returned can be a subset of stored queries, based on the search criteria. In addition, a subsequent query can be performed on the retrieved data to further narrow the results. In another example, the profile generator 110 can copy search information from the storage medium, for example, search queries that were initiated within a time period (e.g., daily, monthly, yearly, etc.). The copied search information can be stored (e.g., in high speed memory) for further processing such as sorting, extraction and/or other delineation techniques to separate and acquire desired search queries.

In another aspect of the present invention, the profile generator 110 can receive the set of queries. For example, a predetermined criterion (e.g., associated with the user or the subject matter) can be established, wherein whenever the user initiates a search query employing criterion substantially similar to the predefined search criterion, the search query, and optionally information associated with the search query, can be automatically transmitted to the profile generator 110 to dynamically construct a set of queries. In another example, a processor and/or a component controlled by the processor can be employed to convey the search queries from the storage medium to the profile generator 110 (e.g., via Direct Memory Access (DMA)). In yet another example, a probabilistic approach can be employed, wherein a search query can be delivered to the profile generator 110 when it is determined that the search query is likely to be associated with a desired set of queries.

In addition to obtaining a set of queries, the profile generator 110 can obtain search query statistical information. For example, a processing component (e.g., a cpu, an arithmetic logic unit (ALU) and a coprocessor) can be employed in connection with the storage medium to compute a frequency of occurrence of queries, a percentage for successful queries, a confidence level that a query is successful, and a fraction of queries initiated by an individual user, and to render inferences and/or decisions based on the data saved to the storage medium. Then, the processing component can convey the information to the profile generator 110. In another aspect of the present invention, the profile generator 110 can compute search query statistical information. For example, the profile generator 110 can compute the frequency of occurrence of an individual search query or a subset of the search query, and/or for a user.

As briefly noted above, the profile generator 110 can obtain the distributional algorithm from the rules bank 120, wherein the rules bank 120 can be a storage medium (e.g., a database, a server and a hard disk) that can store one or more distributional algorithms. In one aspect of the present invention, the rules bank 120 can include an algorithm to generate a substring distribution for a set of queries. In another aspect of the present invention, the rules bank 120 can include an algorithm to generate a string sequence distribution for a set of queries. It is to be appreciated that the foregoing algorithms are illustrative, and not limitative, and that other algorithms can be employed in accordance with an aspect of the invention.

The algorithm can be retrieved prior to obtaining the set of queries, and then utilized in connection with selecting the queries for the set of queries, as noted above. However, it is to be appreciated that other information can be employed to facilitate query selection. For example, the profile generator 110 can be provided with information indicative of the algorithm in order to obtain a suitable set of queries. In another example, a "best guess" of the algorithm can be determined based on a user's prior actions and/or a statistical inference. In yet another example, the algorithm can be changed before, during and after obtaining the set of queries. Then, in one aspect of the present invention, a previously obtained set of queries can be discarded and another set of queries can be obtained based on the present algorithm. In another aspect of the present invention, a filter can be applied against the previously obtained set of queries to retain suitable queries, which can reduce the time consumed to obtain the remaining suitable queries to populate the desired set of queries.

After obtaining the set of queries, the distributional algorithm, and optionally additional information, the profile generator 110 can apply the algorithm to the set or queries to generate a distributional characteristic for the set of search queries. Then, the distributional characteristic can be employed to improve content search engine search results. For example, the distributional characteristic can be utilized to generate a measure of similarity (e.g., via any known technique, for example the cosine distance) between queries. For example, learning that a user who initiates a query for "X" is likely to be interested in the results returned by a query for "Y" can indicate that "X" and "Y" often appear in similar string contexts, and thus are distributionally similar. In another example, learning that a user who queries for "X" eventually queries for "Y" can indicate that "X" and "Y" are sequentially related in query sequence, or distributionally similar.

Conventional approaches that employ probability distribution based techniques utilize a running text domain, wherein merely the word(s) preceding and/or following a word is utilized. The present invention utilizes a novel and powerful approach that leverages a wealth of information saved in the query transactions (e.g., in a query log domain) to generate a distributional characteristic, based on a substring and/or a query string sequence, for example. The foregoing distributional characteristic can improve searching via providing for a mechanism to determine synonymous terms, detect grammatical errors, detect punctuation errors, and determine term variation, and facilitate collaborative filtering. In addition, the distributional characteristic can provide information indicative of what queries are failing and why queries are failing can be obtained, and facilitate acquiring results with greater degree of correlation to the content being searched.

Figure 2:
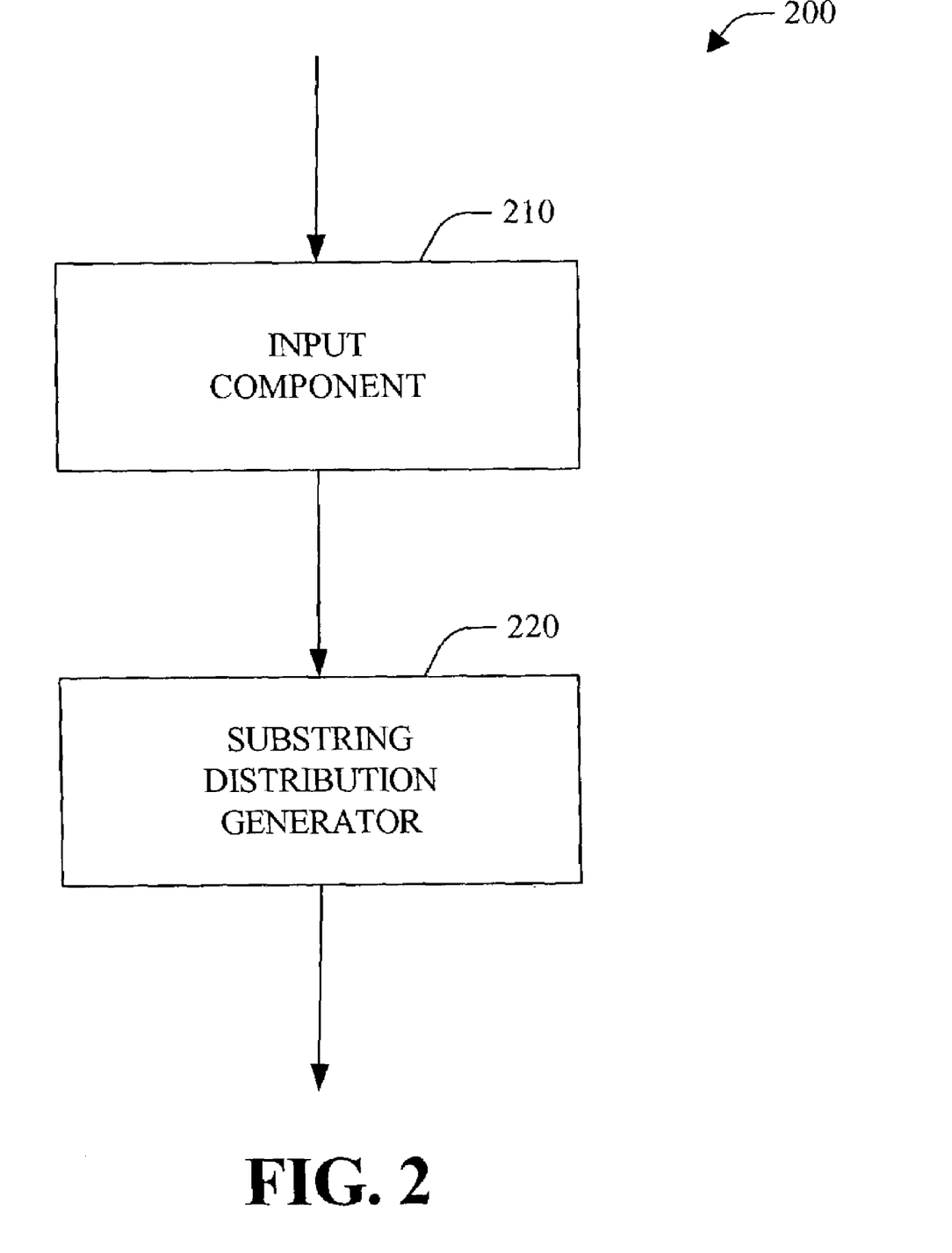
FIG. 2 illustrates a system that employs a substring distributional analysis technique in connection with a search engine, in accordance with an aspect of the present invention.

Next at FIG. 2, a system 200 that employs a substring distributional analysis technique to facilitate search engine search results in accordance with an aspect of the present invention is illustrated. The system 200 comprises an input component 210 and a substring distribution generator 220.

The input component 210 can be employed to obtain a set of queries from one or more users. As briefly noted above, a search query along with associated information can be concurrently and/or serially saved when a search engine is deployed to perform a search. The input component 210 can obtain the set of queries from the query log via selecting queries that are suitable for the substring distributional algorithm. After obtaining the set, they can be conveyed to the substring distribution generator 220.

The substring distribution generator 220 can utilize the set of queries to determine the substring distributions. In one aspect of the present invention, the substring distribution can be represented as the probability distribution over a string, or query. For example, for any substring "S," the substring distribution can be represented as the probability distribution over strings that include the substring "S." For example, if a set of queries is obtained that includes ten queries for "Dog food," five queries for "I love dogs," two queries for "Pictures of dogs," one query for "My dog bob," thirty queries for "Catnip," twenty queries for "Cat food," and five queries for "Pictures of cats," then the frequency of occurrence for the individual strings is ten for "Dog food," five for "I love dogs," two for "Pictures of dogs," one for "My dog bob," thirty for "Catnip," twenty for "Cat food," and five for "Pictures of cats," The foregoing queries and frequencies of occurrence for the queries is summarized below in Table 1.

TABLE 1

Frequency of Occurrence

| Query | Frequency of Occurrence |
| --- | --- |
| Dog food | 10 |
| I love dogs | 5 |
| Pictures of dogs | 2 |
| My dog bob | 1 |
| Catnip | 30 |
| Cat food | 20 |
| Pictures of cats | 5 |

Then, employing the frequency of occurrences, the distributional characteristics for "dog" over strings that contain "dog" are: P(___ food)=10/18; P(I love ___s)=5/18; P(Pictures of ___s)=2/18; and P(my___ bob)=1/18, and the distributional characteristics for "cat" over strings that contain "cat" are: P(___nip)=30/55; P(___food) =20/55; and P(Pictures of ___s)=5/55. The distributional characteristics for "dog" and "cat" are summarized below in Table 2.

TABLE 2

Distributional Characteristics

| Query | Substring Distributions |
|---|---|
| P(Dog _) | 10/18 |
| P(I love _s) | 5/18 |
| P(Pictures of _s) | 2/18 |
| P(My _bob) | 1/18 |
| P(_nip) | 30/55 |
| P(_food) | 20/55 |
| P(Pictures of _s) | 5/55 |

It is to be appreciated that any two strings can share a distributional environment(s) (e.g., be a substring of a similar string). For example, the strings "dog" and "cat" in the above example share the distributional environments "___ food" and "pictures of___s."

The substring distribution generator 220 can then provide the substring distribution for analysis. For example, the substring distributions can be employed to determine similarity. For example, any known techniques such cosine distance can be employed to determine the similarity between any query strings. The similarity computations and/or the generated distributional characteristic can be employed to improve search engine searches by providing a technique to determine synonymous terms and term variations, detect grammatical and punctuation errors, and employ collaborative filtering. As noted above, conventional distributional techniques simply employ running text, and merely determine similarity via preceding and/or subsequent common words.

Figure 3:
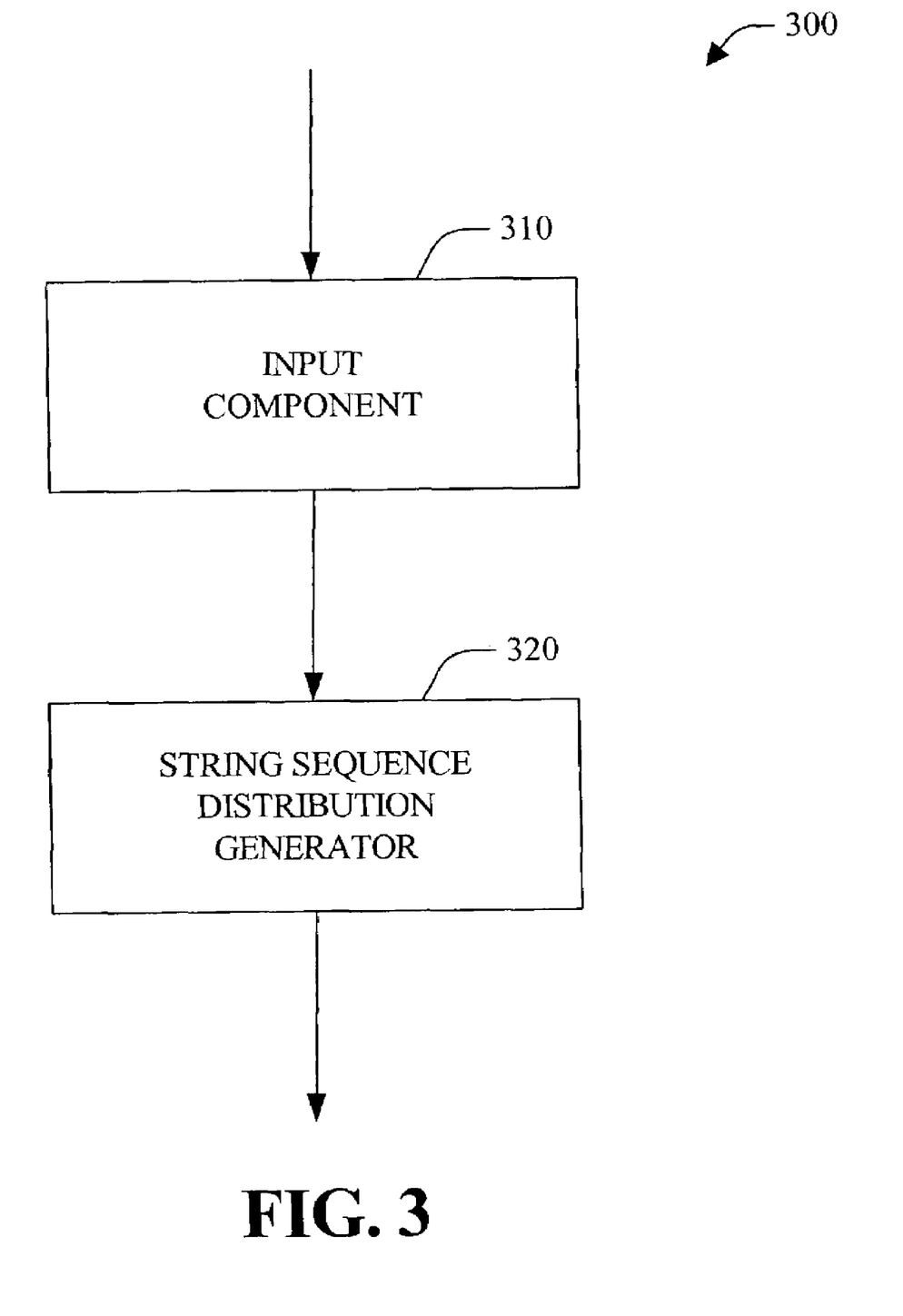
FIG. 3 illustrates a system that employs a string sequence distributional analysis technique in connection with a search engine, in accordance with an aspect of the present invention

FIG. 3 illustrates a system 300 that employs a string sequence distributional analysis technique to facilitate search engine results in accordance with an aspect of the present invention. The system 300 comprises an input component 310 and a distributional characteristic generator 320.

The input component 310 (e.g., the input component 210) can be employed to obtain a set of queries from one or more users, and can convey the set of queries to the string sequence distribution generator 320. As noted above, the set of queries can be obtained from a query log that is populated with search transactions when a search query is executed. The search transactions saved to a query log can include the search query and associated information such as a unique identification (e.g., a global unique identifier, or GUID) for the user that generated the search. In one aspect of the present invention, the input component 310 can obtain queries from the query log, based at least in part on GUID, and then construct a set of queries, wherein the queries are associated with a user associated with the GUID.

After receiving the set of queries from the input component 310, the string sequence distribution generator 320 can compute a string sequence distributional profile for the set of queries. For example, in one aspect of the present invention a string "S" can be characterized by the probability distribution of queries that a user queries subsequent the query "S."

The string sequence distribution generator 320 can then provide the string sequence distributional characteristic to a similarity component, for example, in order to analyze the sequence to determine query similarity. Similar to the system 200, any known technique such as the cosine distance can be employed to determine the similarity between query strings. Likewise, the distributional similarity can be employed to enhance searches by providing a technique to determine synonymous terms and term variations, detect grammatical and punctuation errors, and employ collaborative filtering.

Figure 4:
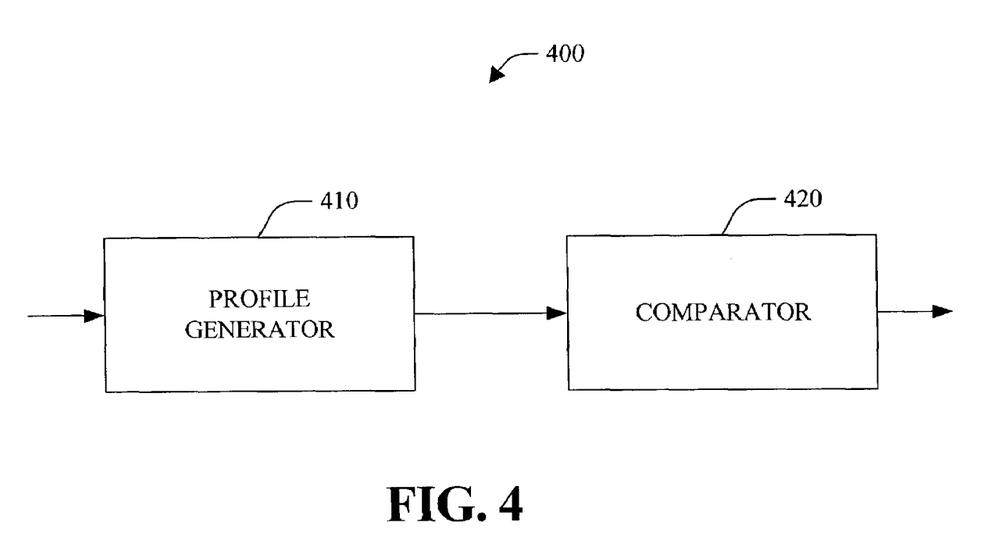
FIG. 4 illustrates a system that can improve search engine results, in accordance with an aspect of the present invention.

FIG. 4 illustrates a system 400 that can facilitate search engine search results in accordance with an aspect of the present invention. The system 400 comprises a profile generator 410 that can compute a distributional profile for a set of queries and a comparator 420 that can determine a distributional similarity between the computed distributional profiles.

The profile generator 410 can be employed to obtain a set of queries, as described above in connection with systems 100-300. For example, in one aspect of the present invention, the queries within the set of queries can be selected from a group of search queries stored in query log and based at least in part on criteria such as a distributional algorithm, a string and/or user identification. For example, where a substring distribution is to be generated from the set of queries, the queries obtained can be based on a query substring and/or string for one or more users. In another example, where a string sequence distribution is to be employed to generate the distributional characteristic, the queries obtained can be based on indicia (e.g., a GUID) indicative of the user who initiated the query.

In one aspect of the present invention, the profile generator 410 can interface with the query log to obtain the set of queries. The query log can include one or more query transactions that comprise information such as a query search, a unique identification, an indication as to whether the search was successful (e.g., whether any results were returned or whether the user followed with another search with a similar search term), a probable reason why the search failed, and/or other information such as search engine identification and/or client ID. In another aspect of the present invention, the profile generator 410 can interface with an archival system employed for long-term storage of search query. In yet another aspect of the present invention, a user can manually provide search queries to the profile generator 410. For example, a user can train the profile generator 410 via supplying a training set of search queries. In another example, the user can manually input search queries, for example to discriminate which search queries are utilized to affect search engine behavior. In still another aspect of the present invention, search queries can be conveyed to the profile generator 410 when a search is launched.

After obtaining the set of queries, the profile generator 410 can generate the distributional characteristic for the set of queries, as described supra. For example, in one aspect of the present invention, the profile generator 410 can further obtain and/or determine the frequency of occurrence for respective search queries, and then generate a substring distributional characteristic. In another aspect of the present invention, the profile generator 410 can generate a string sequence distributional characteristic. After generating the distributional characteristic, the profile generator 410 can convey the distributional characteristic to the comparator 420.

The comparator 420 can then determine a distributional similarity for a distributional characteristic. The comparator 420 can employ known techniques that measure the similarity between probability distributions. For example, the comparator 420 can employ a cosine distance, the Jaccard coefficient, an entropy-based measure (e.g., the entropy of the distributions), a divergence measure and/or a relative separation measure.

The cosine distance, or similarity can be defined via equations 1-2. Equation 1 depicts the cosine of the angle ($c(T_i,T_j)$) between the sets of queries. Typically, normalization is employed over the intersection of the sets of informative terms.

Equation 1:

$$c(T_i, T_j) = \frac{\Sigma k : t_k \in I(i,j) \omega_{ik} \cdot \omega_{jk}}{\|W_i\| \cdot \|W_j\|}.$$

Equation 2 depicts the score, or similarity measure for the cosine distance.

Equation 2:

$$S(T_i, T_j) = \frac{|I(i,j)|}{|U(i,j)|} \cdot c(T_i, T_j),$$

where $S(T_i,T_j)$ is the similarity between two sets of queries, $I(i,j)$ is the set of terms common to $T_i$ and $T_j$, $U(i,j)$ is the union of the two sets, and $c(T_i,T_j)$ is the cosine angel.

The Jaccard coefficient equation can measure the degree of overlap between two sets, and is defined in equation 3.

Equation 3:

$$S(T_i, T_j) = \frac{|I(i,j)|}{|U(i,j)|},$$

where $S(T_i,T_j)$ is the similarity, $I(i,j)$ is the set of terms common to $T_i$ and $T_j$, and $U(i,j)$ is the union of the two sets. A weighted Jaccard coefficient equation measures the weighted overlap between two sets. For the weighted Jaccard coefficient, the denominator is a consequence of the assumed normalization of the two vectors. The weighted Jaccard coefficient is defined in equation 4.

Equation 4:

$$S(T_i, T_j) = \frac{\Sigma k : l_k \in I(i,j)(\omega_{ik} + \omega_{jk})}{2}.$$

Equation 5 illustrates an exemplary entropy based similarity measure, or a weighted mutual information measure. The weighted mutual information measure is loosely based on the mutual information of distributions on two random variables X and Y, calculated as $I(X,Y)=H(X)+H(Y)-H(XY)$. The weighted mutual information measure is defined as:

Equation 5:

$$S(T_i, T_j) = \frac{|I(i,j)|}{|U(i,j)|} \cdot (H(i) + H(j) - H(ij)),$$

where $S(T_i,T_j)$ is the similarity, $I(i,j)$ is the set of terms common to $T_i$ and $T_j$, $U(i,j)$ is the union of the two sets, $H(i)$ is the entropy of a set of queries i, $H(j)$ is the entropy of a set of queries j, and $H(ij)$ is the entropy of the combined set of queries i and j.

Figure 5:
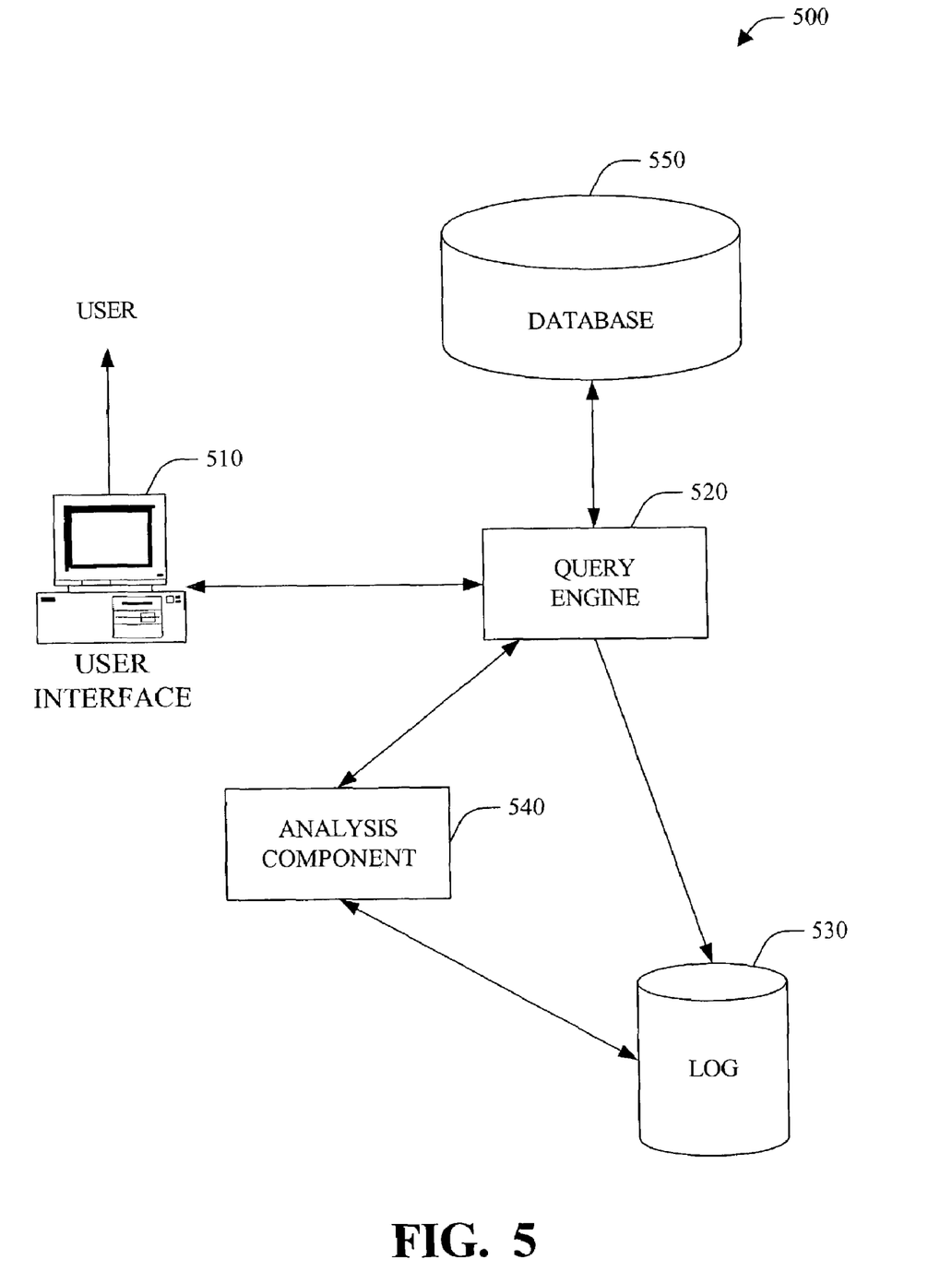
FIG. 5 illustrates a system that employs distributional adaptive feedback to improve content search engine results, in accordance with an aspect of the present invention.

Next at FIG. 5, a system 500 that employs an adaptive feedback mechanism to improve search engine query results in accordance with an aspect of the present invention is illustrated. The system 500 comprises a user interface 510, a query engine 520, a log 530, an analysis component 540, and a database 550.

The user interface 510 (e.g., a web browser) can be employed by a user to initiate a search query. Typically, the user interface 510 is a graphical user interface (GUI); however, it can be a command line interface or any known interface, for example. For example, a GUI can be employed in connection with a search engine, wherein the GUI can provide the user a region or means to input search information, and include a region to present the results of the search. For example, the GUI can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can provide search information via entering the information into an edit control.

The user can interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance.

In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

After the user enters search information into the use interface 510, the information can be conveyed to the query engine 520, for example via a mouse click. The query engine 520 can store a copy of the search, and optionally additional information such as an identification for the user initiating the search, to the log 530. The log 530 can comprise non-volatile and volatile storage media. For example, the log 530 can comprise non-volatile memory such as a server, flash memory, a hard disk, tape, an optical disk, a laser disk (e.g., CD, DVD and variants thereof), and the like. Suitable volatile memory includes cache, synchronous dynamic RAM (SDRAM), dynamic RAM (DRAM), fast page RAM (FPRAM) and extended data-out RAM (EDORAM), for example. Volatile RAM is commonly utilized by the operating system for run time applications and user programs; however, it can be employed for temporary storage of search query information in order to provide high-speed access to the information. In addition, the information stored in the volatile memory can be copied to non-volatile memory for long-term storage when power is removed or the system transitions to an idle (e.g., hibernation and sleep) state.

The query engine 520 can additionally interact with the analysis component 540 to improve the search via adaptive feedback. For example, the analysis component 540 can obtain a set of queries based on a current algorithm or instruction set from the log 530, generate a distributional characteristic or profile for the set of queries, and determine distributional similarities between distributional characteristics, as described herein. In one aspect of the present invention, the algorithm or the instruction set can be employed to generate a substring distribution for the set of queries. In another aspect of the present invention, the algorithm or the instruction set can be employed to generate a string sequence distribution.

After generating the distributional characteristics, the analysis component 540 can determine a distributional similarity between distributional characteristics. For example, the query engine can employ techniques such as a cosine distance, the Jaccard coefficient, an entropy-based measure, a divergence measure and/or a relative separation measure to measure the similarity between probability distributions.

The query engine 520 can then employs the similarity measure in connection with searching the database 550 (e.g., sites and severs accessed via the Internet). The similarity measurement can improve the search via facilitating determining synonymous terms, detecting grammatical errors, detecting punctuation errors, and determining term variation, and providing for collaborative filtering. Conventional approaches typically employ distributional techniques that merely utilize the running text domain that employs preceding and/or following word(s) to determine similarity. Thus, the present invention improves searches via mining saved query transactions in the query log domain to generate a substring or a string sequence distributional profile, and perform a distributional analysis on the profile.

After searching the database 550, the results can be returned to the query engine 520, and presented to the user. It is to be appreciated that the analysis component 540 can additionally be employed to improve the presentation of the search results to the user. For example, the analysis component 540 can affect the order in which the results are presented. In another example, the analysis component 540 can filter the results prior to display. In yet another example, the analysis component 540 can display useful information to the user, such as an alternative query(s) and an additional query(s) that can be of interest.

Figure 6:
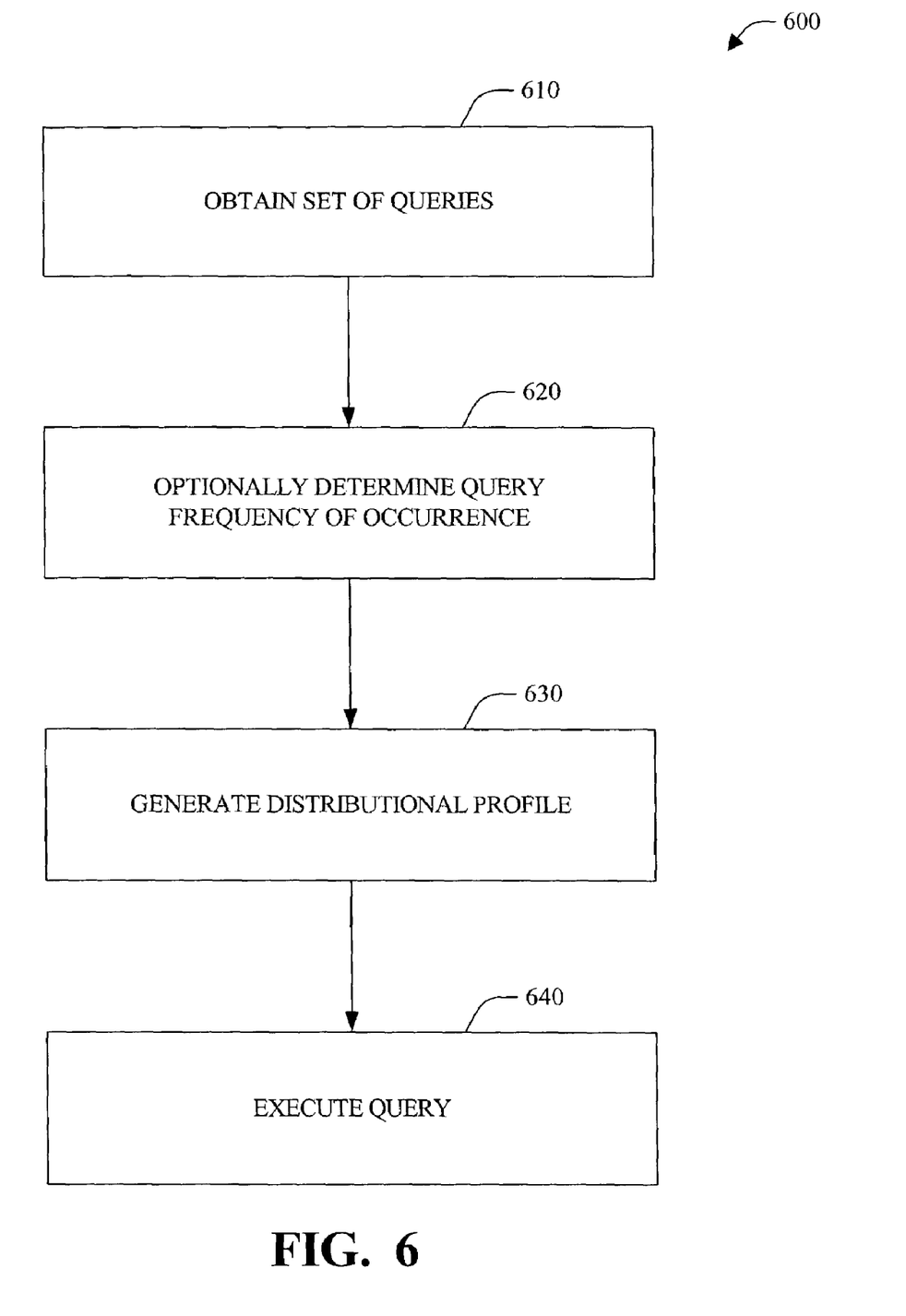
FIG. 6 illustrates a methodology to generate a distributional characteristic for a set of queries, in accordance with an aspect of the present invention.
Figure 7:
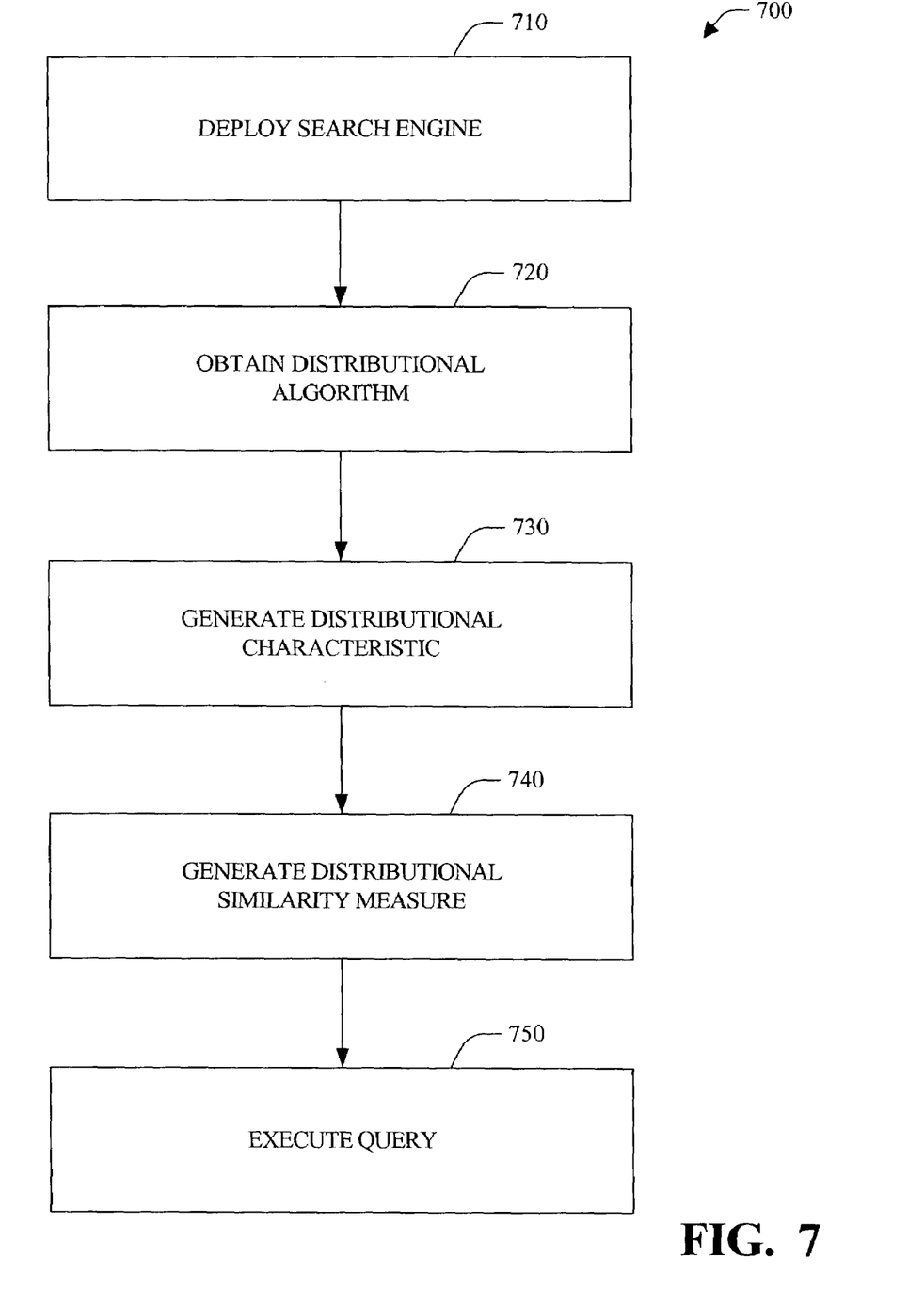
FIG. 7 illustrates a methodology to employ a distributional similarity measure, based on a substring and/or a string sequence distributional characteristic, in connection with a search query, in accordance with an aspect of the present.

FIGS. 6 and 7 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement a methodology in accordance with the present invention. In addition, those skilled in the art will understand and appreciate that a methodology could alternatively be represented as a series of interrelated states (e.g., state diagram) or events.

Proceeding to FIG. 6, a methodology 600 to generate a distributional characteristic for a set of queries is illustrated. Proceeding to reference numeral 610, a set of queries suitable to generate a distributional profile is obtained. As described herein, the queries can be obtained from a query log that includes search queries and search query initiator identification that are saved to the query log when a user initiates a search query. The queries can be selected based on various criteria, for example based on a keyword(s), a term(s), a string(s), a query(s), and/or a unique identification associating a user with a query. Depending on the distributional algorithm, the set of queries can comprise one or more queries associated with one or more unique identifications.

Next at reference numeral 620, a frequency of occurrence of the set of queries and/or other statistical information can be optionally generated. For example, a statistics component can be employed to compute a frequency of occurrence of queries. The computed frequency of occurrence can be employed in connection with a substring distributional algorithm to compute a substring distributional profile.

At 630, a distributional (e.g., substring and string sequence) algorithm can be obtained and applied to the set of queries to generate a distributional profile. In general, the algorithm can be obtained from a storage medium such as a database or rules bank, for example. If a substring distributional algorithm is employed, then a substring distribution for a substring "S," for example, can be represented as the probability distribution over the strings including "S," and can be generated via employing the frequency of occurrence of strings comprising the substring "S," as described in detail above. If a string sequence distributional algorithm is employed, then a distributional profile for the string sequences can be generated for the set of queries, wherein a string "S," for example, can be characterized by the probability distribution of queries that a user queries subsequent the query "S," as described above.

At reference numeral 640, the distributional profile can be conveyed for further analysis. For example, a similarity measure (e.g., a cosine distance, a Jaccard coefficient, an entropy-based measure, a divergence measure and/or a relative separation measure) can be employed to determine the distributional similarity between queries. The foregoing methodology provides a novel and powerful approach that leverages saved query transactions via mining a query log to generate substring and/or string sequence distributional profiles. Such an approach can improve searching via providing for a mechanism to determine synonymous terms, detect grammatical errors, detect punctuation errors, and determine term variation, and facilitate collaborative filtering.

Proceeding to FIG. 7, a methodology 700 to employ distributional similarity between substring and/or string sequence distributional characteristics in connection with a search query is illustrated. Proceeding to 710, a search engine within a web browser is deployed to search a site and/or server coupled to the Internet or an intranet. For example, a search query, string, term, and/or phrase can be entered into any known search engine, and the search engine can be launched to query sites and servers.

Prior to querying the sites and/or severs, a distributional analysis can be performed to facilitate the search. For example, at 720 the distributional characteristic algorithm can be ascertained. Then the algorithm can be employed to determine query selection criteria. For example, the criteria can denote queries associated with a particular user(s) via a unique identification. In another example, the criteria can denote queries associated with a particular a string. After the set of queries is obtained, the algorithm can elicit further processing, for example, another query or filter to further reduce the set, and/or generating statistics such as the frequency of occurrence for the set of queries.

Then at 730, the distributional algorithm can be applied to the set of queries to generate a distributional characteristic. For example, a substring distributional algorithm or a string sequence distributional algorithm. As noted above, a substring distributional algorithm can be generated for a substring, based on the frequency of occurrence of strings comprising the substring, to render the probability distribution of the substring over the strings that comprise the substring. A string sequence distributional characteristic algorithm can be employed to generate a string sequences distributional profile for a string that characterizes the string as the probability distribution of queries that a user queries subsequent the query with the string.

Next at 740, a distributional similarity can be generated with the distributional characteristic. For example, a similarity measure (e.g., a cosine distance, a Jaccard coefficient, an entropy-based measure, a divergence measure and/or a relative separation measure) can be employed to determine the distributional similarity between queries. For example, two queries can be deemed distributionally similar if it is discerned that a user who executes a first query is likely to be interested in the results returned by a second query (e.g., queries that often appear in similar string contexts). In another example, two queries can be deemed distributionally similar if it is discerned that a user who executes a first query eventually executes a second query (e.g., the queries are sequentially related).

At 750, the search engine can employ the foregoing in connection with searching the sites and/or servers to improve content search engine results. For example, the foregoing can provide a mechanism to determine synonymous search terms, spelling corrections, and spelling variations. In addition, the foregoing can facilitate collaborative filtering. Moreover, the foregoing can be employed to provide information regarding correlated searches, which can facilitate anticipating a user's needs, and enhance a subsequent search in order to return results more correlated to the content being searched by the user.

Figure 8:
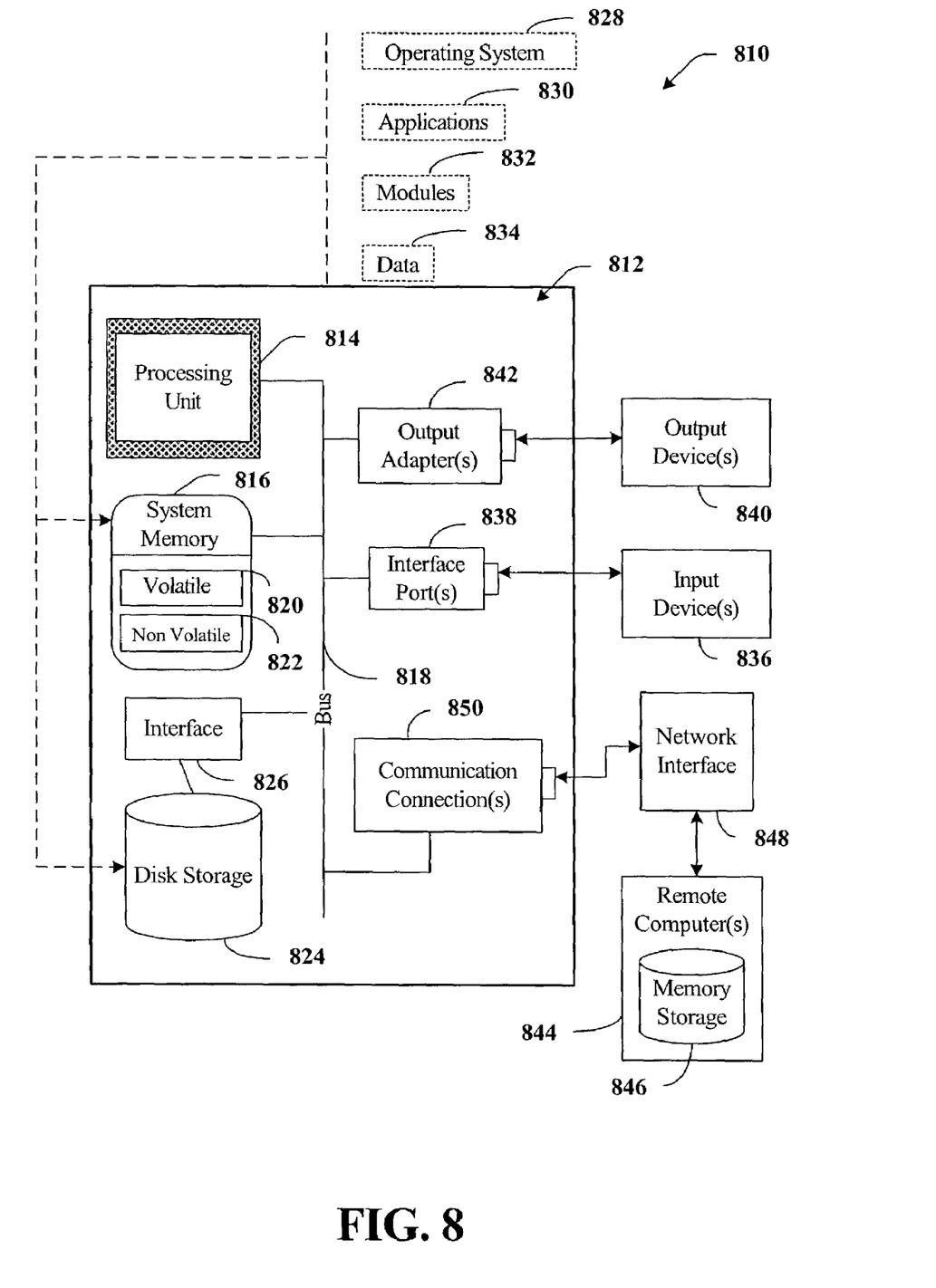
FIG. 8 illustrates an exemplary operating system in accordance with one aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" and variants thereof are used in the detailed description or the claims, these terms are intended to be inclusive in a manner similar to the term "comprising."

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

What is claimed is:

1. A system that facilitates analyzing a search query log, comprising:
   a computer readable storage medium having stored thereon:
   a component that obtains a set of queries from the query log;
   a distributional component that defines a respective probability distributional characteristic for the set of queries wherein the distributional characteristic is generated from at least one of a substring distribution algorithm that represents a distribution characteristic for a substring as a probability distribution over strings that include the substring or a string sequence distribution algorithm that represents a distribution characteristic for a query as a probability distribution of queries that a user queries subsequent the query; and
   a similarity component that suggests similar query terms by computing a distributional similarity measure between respective probability distributional characteristics of the query terms, wherein:
   the set of queries is obtained from the query log based on the substring distribution algorithm or the string sequence distribution algorithm; and
   the set of queries is selected based on one or more of:
   a distribution algorithm;
   a global unique identification (GUID);
   a substring; or
   a string.

2. The system of claim 1, further comprising a processing component that generates a statistic for the queries in the set of queries.

3. The system of claim 2, the statistic comprising a frequency of occurrence for the queries in the set of queries.

4. The system of claim 3, the distributional component employing the frequency of occurrence to generate a substring distributional characteristic.

5. The system of claim 4, the substring distributional characteristic generated for a plurality of users.

6. The system of claim 1, the string sequence distributional characteristic associated with an individual user.

7. The system of claim 1, the query log including at least previously executed query searches and user information associated with the previously executed searches.

8. The system of claim 1, employed in connection with a search engine.

9. A system embodied on a computer readable storage medium, that employs distributional analysis on a query log to facilitate improving search engine query results, comprising:
   a component that obtains a set of queries by mining queries from a query log based on at least one of a distributional algorithm, a substring, a string, or a user identification, wherein the set of queries comprises a saved search query or a null set;
   a profiling component that generates probability distributional profiles for the set of queries based at least on one of a substring distribution algorithm that represents a distribution characteristic for a substring as a probability distribution over strings from the query log that include the substring or a string sequence distribution algorithm that represents a distribution characteristic for a query as a probability distribution of queries that a user queries subsequent the query, wherein the obtained set of queries is dependent upon the distribution algorithm; and
   a similarity component that employs the distributional profiles to output query terms with similar profiles by generating a distributional similarity between the distributional profiles.

10. The system of claim 9, the query log including one or more of previously executed query searches, user information associated with the previously executed searches, an indication as to whether the search was successful, and a probable reason why a search failed.

11. The system of claim 9, the profiling component further comprising determining the frequency of occurrence for respective search queries, and employing the frequency of occurrence to generate a substring distributional profile.

12. The system of claim 9, the similarity component employing one of a cosine distance, a Jaccard coefficient, an entropy-based measure, a divergence measure and a relative separation measure to generate the distributional similarity.

13. The system of claim 9, the distributional similarity employed to provide at least one of a synonymous search term, a spelling correction, and a spelling variation.

14. The system of claim 9, the distributional similarity employed to facilitate collaborative filtering.

15. The system of claim 9, the distributional similarity employed to facilitate collaborative filtering to render search results with a greater degree of correlation to the content being searched, determining what queries are failing, determine why queries are failing, or combinations thereof.

16. The system of claim 9, the distributional similarity employed to provide information regarding correlated searches to facilitate anticipating a user's needs.

17. The system of claim 9, the distributional similarity employed to enhance the presentation of the search results to the user.

18. The system of claim 9, the distributional profile further employed to determine at least one of an alternative query(s) and an additional query(s) that can be of interest, wherein the alternative query(s) and the additional query(s) can be provided to the user.

19. The system of claim 9, further comprising a user interface (UI).

20. The system of claim 19, the UI comprising one of a graphical user interface (GUI) and a command-line interface.

21. The system of claim 19, the UI being a web browser.

22. The system of claim 20, the GUI comprising one or more of a text region, a graphic regions, a dialogue box, a static control, a drop-down-menu, a list box, a pop-up menu, an edit control, a combo box, a radio button, a check box, a push button, a vertical scroll bar, and a horizontal scroll bar.

23. A computer-readable storage medium that performs a method to analyze a search query log for building a string sequence distributional profile, the method comprising:
    identifying a user;
    obtaining a set of queries from the query log executed by the user, wherein the set of queries is selected based on one or more of a substring, a string, a keyword, or global unique identification (GUID);
    generating a respective probability distributional profile for the queries wherein the distributional profile characterizes a query from the set of queries by probability distribution of queries that the user executes subsequent the query, wherein the set of queries are obtained from the query log based on the probability distributional profile; and
    suggesting at least one of alternate query terms or additional query terms to a consumer based on the respective probability distributional profile.

24. The method of claim 23, generating the distributional profile from a string sequence distribution algorithm.

25. The method of claim 23, the distributional profile comprising a string sequence distribution profile, the string sequence distribution profile is employed to generate a measure of similarity between queries from the set of queries.

26. The method of claim 23, further comprising generating a frequency of occurrence for the queries in the set of queries, and employing the frequency of occurrence to generate the distributional profile.

27. The method of claim 23, employed in connection with a search engine.

28. A computer-readable storage medium that performs a method that employs distributional analysis to facilitate search engine searches, the method comprising:
    mining a query log based on one or more of a distribution algorithm, a global unique identification (GUID), a substring, or a string to identify a set of queries that comprises a saved search query or a null set;
    generating probability distributional characteristics for the set of queries based at least on one of a substring distribution algorithm that represents a distribution characteristic for a substring as a probability distribution over strings from the query log that include the substring or a string sequence distribution algorithm that represents a distribution characteristic for a query as a probability distribution of queries that a user queries subsequent the query; and
    suggesting additional query terms to a user by employing a distributional similarity obtained from the distributional characteristics to determine the similar query terms, wherein the mined set of queries is dependent upon the distribution algorithm.

29. The method of claim 28, the distributional characteristic comprising one of a substring distributional characteristic and a string sequence distributional characteristic.

30. The method of claim 28, employed in connection with a search engine to provide a mechanism to determine synonymous search terms, spelling corrections, and spelling variations, facilitate collaborative filtering, correlated searches, anticipating a user's needs, and enhance a subsequent search in order to return results more correlated to the content being searched by the user.

31. The method of claim 28, the distributional similarity based on one of a cosine distance, a Jaccard coefficient, an entropy-based measure, a divergence measure and a relative separation measure.

32. The method of claim 28, further comprising generating a frequency of occurrence for the queries in the set of queries, and employing the frequency of occurrence to generate a substring distributional characteristic.

33. A computer readable medium storing computer executable components that employs distributional analysis on a query log to improve search query results, comprising:
    a component that obtains a set of queries from the query log based on criteria associated with a distributional algorithm, wherein the component obtains the set of queries based on one or more of a distribution algorithm, a global unique identifier (GUID), a substring, or a string;
    a component that employs the distributional algorithm to generate a probability distributional profile for the set of queries wherein the distributional algorithm includes at least on one of a substring distribution algorithm that represents a distribution characteristic for a substring as a probability distribution over strings from the query log that include the substring or a string sequence distribution algorithm that represents a distribution characteristic for a query as a probability distribution of queries that a user queries subsequent the query; and
    a component that employs the distributional profile to generate a distributional similarity that can be utilized to improve content search query results by suggesting similar query terms recognized across separate queries.

34. A system that employs distributional analysis with query searches, comprising:
    a computer readable storage medium having stored thereon:
    means for obtaining a set of queries from the query log based on one or more of a distribution algorithm, a global unique identifier (GUID), a substring, or a string;
    means for generating probability distributional characteristics for queries in the set of queries, the distributional characteristics are based on a substring analysis that computes a distribution characteristic for a substring as a probability distribution over strings from the query log that include the substring or analysis of a sequence of searches from the query log, wherein the set of queries are obtained based on the probability distribution; and
    means for identifying relevant query terms with similar distributional characteristics by generating a similarity measure between the probability distributional characteristics.

* * * * *